United States Patent
Baeriswyl et al.

(10) Patent No.: US 9,593,774 B2
(45) Date of Patent: Mar. 14, 2017

(54) PISTON FOR AN AXIAL PISTON MACHINE

(71) Applicant: Liebherr Machines Bulle SA, Bulle (CH)

(72) Inventors: Mario Baeriswyl, Duedingen (CH); Erwin Feusi, Schmitten (CH)

(73) Assignee: Liebherr Machines Bulle SA, Bulle (CH)

( * ) Notice: Subject to any disclaimer, the term of this patent is extended or adjusted under 35 U.S.C. 154(b) by 271 days.

(21) Appl. No.: 14/223,018

(22) Filed: Mar. 24, 2014

(65) Prior Publication Data

US 2014/0283681 A1 Sep. 25, 2014

(30) Foreign Application Priority Data

Mar. 25, 2013 (CH) ...................................... 0661/13

(51) Int. Cl.
| | | |
|---|---|---|
| *F16J 1/00* | (2006.01) | |
| *F04B 1/12* | (2006.01) | |
| *F01B 3/00* | (2006.01) | |
| *F04B 53/14* | (2006.01) | |
| *F03C 1/28* | (2006.01) | |

(52) U.S. Cl.
CPC ............... *F16J 1/00* (2013.01); *F01B 3/0085* (2013.01); *F03C 1/0605* (2013.01); *F04B 1/124* (2013.01); *F04B 53/14* (2013.01); *Y10T 29/49249* (2015.01)

(58) Field of Classification Search
CPC .. F04B 1/12; F04B 27/08; F16J 15/162; F16J 1/08; F15B 15/149

USPC ..................... 92/71, 111, 157, 176
See application file for complete search history.

(56) References Cited

U.S. PATENT DOCUMENTS

| | | | | |
|---|---|---|---|---|
| 3,319,575 A | | 5/1967 | Havens | |
| 4,191,095 A | * | 3/1980 | Heyl .................... | F01B 3/0085 91/488 |
| 5,216,943 A | * | 6/1993 | Adler ................. | B22D 19/0027 29/888.042 |
| 6,216,584 B1 | * | 4/2001 | Terauchi ............. | F04B 27/0878 92/160 |
| 6,237,467 B1 | * | 5/2001 | Beck .................... | F01B 3/0085 92/157 |
| 6,274,083 B1 | * | 8/2001 | Clark, III ................ | B22F 3/225 419/40 |
| 6,314,864 B1 | * | 11/2001 | Beck .................... | F01B 3/0085 92/157 |
| 6,378,416 B1 | * | 4/2002 | Kato ................... | F04B 27/0878 92/172 |
| 6,431,051 B1 | * | 8/2002 | Stoppek .................... | B22F 3/22 92/157 |
| 6,491,206 B2 | * | 12/2002 | Stoppek ................. | B23P 15/10 228/113 |

(Continued)

FOREIGN PATENT DOCUMENTS

| | | |
|---|---|---|
| DE | 23 64 725 A1 | 7/1975 |
| DE | 36 02 651 A1 | 7/1987 |

(Continued)

*Primary Examiner* — Thomas E Lazo
(74) *Attorney, Agent, or Firm* — Cornell & Moring LLP (57) ABSTRACT

A piston for an axial machine includes a piston body having a cavity that is closed in a pressure-tight way. The cavity is divided into a plurality of chambers, arranged one beside the other in cross-section.

15 Claims, 5 Drawing Sheets

(56) References Cited

U.S. PATENT DOCUMENTS

| | | | | |
|---|---|---|---|---|
| 6,925,925 B2* | 8/2005 | Casar | ................ | F04B 27/0878 |
| | | | | 92/12.2 |
| 6,941,852 B1* | 9/2005 | Le | ...................... | F04B 27/0878 |
| | | | | 92/175 |
| 7,650,829 B2* | 1/2010 | Beck | ...................... | B23P 15/10 |
| | | | | 29/888.04 |

FOREIGN PATENT DOCUMENTS

| | | |
|---|---|---|
| DE | 199 34 217 A1 | 2/2001 |
| DE | 197 06 075 C2 | 5/2001 |

* cited by examiner

PISTON FOR AN AXIAL PISTON MACHINE

CROSS REFERENCE TO RELATED APPLICATION

This application claims priority under 35 U.S.C. §119 to application no. 00661/13, filed Mar. 25, 2013, in Switzerland, the entire disclosure of which is expressly incorporated herein by reference.

BACKGROUND OF THE INVENTION

The present invention relates to a piston for an axial piston machine. The piston can be a piston for an axial piston machine with a swash plate design or a wobble plate design.

In known axial piston machines solid pistons, which set limits on an operation with higher speeds, are used. At increased speeds, strength problems arise for the cylinders due to large centrifugal forces, and due to the large mass forces strength, problems arise for the piston retaining means. Furthermore, thermal problems can arise at the contact surfaces between piston and cylinders, as high frictional forces result from the centrifugal forces.

As an alternative to solid pistons, hollow pistons therefore are used, in order to operate axial piston machines with increased speed. In usual hollow pistons the hollow piston body includes a cavity open towards the working cylinder. However, this has the disadvantage that the cavity forms a dead space which is compressed and then decompressed again at each piston stroke. The non-negligible compressibility of the hydraulic fluid leads to a deterioration of the efficiency.

It is known from various documents, such as U.S. Pat. No. 3,319,575, German Patent application document DE 199 34 217 A1, and German Patent application document DE 2 364 725 A1, to close the cavity provided in the piston body in a pressure-tight way. As each cavity, an annular space is provided, which extends between an outer cylindrical sleeve and a central column. On their end faces, facing the cylinder space, the cylindrical outer sleeve and the central column are provided with an end closure which closes the annular cavity towards the working side of the piston. In the central column an axial pressure lead-through extends, which serves the lubrication of the slipper of the piston.

Such a piston design however, can lead to problems during friction welding, which is usually employed for mounting the closure, since the central column is greatly loaded. In addition, the manufacture of the annular cavity by extrusion is expensive. From German Patent application document DE 36 02 651 A1, it is known to design the cavity provided for reducing the mass hollow-cylindrical as a whole, and to let the fluid supply channel for the lubricating oil supply extend in the piston skirt wall. However, this in turn requires an expensive design of the piston wall and in addition leads to stability problems with the piston.

From German Patent document DE 197 06 075 C2, it is known to fabricate the piston of an outer tube and an inner tube, each of which, as raw parts, is hollow and cylindrical, with the blank for the outer tube resting against the inner tube by deformation in its end regions, so that an annular space in turn is formed in the piston body. Furthermore, the ball for a ball joint connection with a slipper also will be fabricated by deforming the blank for the outer tube, whereby a ring-shaped hollow space also is obtained in the ball head. There also exists a complicated manufacturing method for the piston, without sufficient stability of the piston being ensured.

SUMMARY OF THE INVENTION

It is one object of the present invention to provide a piston for an axial piston machine that unites the advantages of a solid piston and a hollow piston, is easy to manufacture, and is sufficiently stable.

According to the invention, this object is solved by a piston for an axial piston machine with a piston body, which, in its interior, includes a cavity that is closed in a pressure-tight way. According to the invention, the cavity includes several chambers. Webs left between the chambers lead to stabilization of the piston.

Each of the chambers can separately be closed in a pressure-tight way, or at least partly be connected with each other. It is only necessary that the chambers altogether form a cavity which is closed in a pressure-tight way.

Advantageously, the chambers are arranged one beside the other in cross-section of the piston.

Furthermore advantageously, the chambers extend axially in the piston body. In the same way, the webs which are left between the chambers hence extend axially.

In a preferred embodiment, the chambers are formed to be hollow and cylindrical. This facilitates the manufacture of the chambers. The base area, for example, can be circular, kidney-shaped, polygonal, or oval.

The chambers can be manufacturable by a material-removing method. Particularly preferably, the chambers can be bores, and the bores can axially pass through the piston body.

In one possible embodiment of the present invention, the piston body can include a one-piece base element in which the chambers are incorporated. The chambers can extend from a work-side end face of the base element into the same.

Alternatively, the piston body can include a middle part which is connected with a base part. Preferably, the chambers are arranged in the middle part. In a particularly preferred embodiment, only the middle part includes chambers. The provision of the chambers by the middle part allows less expensive manufacturing of the piston body.

The middle part can be made in one piece or put together from several elements.

The middle part and/or the elements of which the middle part is made preferably are at least partly made by a forming process. Preferably, all elements of which the middle part is made are made by a forming process.

Manufacturing the middle part and/or the elements of which the middle part is made by a forming process preferably is effected by extrusion molding, cold rolling, pilgering, forging, or roll profiling. Extrusion molding is particularly preferable.

The middle part and/or the elements of which the middle part is made at least partly can also be made by DMLS (Direct Metal Laser Sintering). The middle part and/or the elements are produced three-dimensionally by point-by-point melting from a powdery base material.

Preferably, all elements of which the middle part is made are made by DMLS.

When the middle part consists of several elements, the same preferably engage in each other. The engagement can be effected in radial direction and/or in axial direction.

For example, the middle part can be formed by a tube element having an interior in which a core element is arranged such that, together with the tube element, it forms several chambers.

Preferably, the core element contacts the inner surface of the tube element in several, axially or radially distributed regions. In particular, the core element can include several webs which contact the inner surface of the tube element.

Preferably, the webs are longitudinal webs. Furthermore, the core element preferably is an element with a profile that is uniform in longitudinal direction.

Alternatively, the profile element also can include webs in an axial direction. In this case the profile element preferably is composed of several elements in the axial direction.

Furthermore, a combination of radial and axial structures also is possible.

Advantageously, the middle part is connected with the base part such that the base part closes chambers open towards the contact surface of the middle part with the base part.

The base part can serve as connecting element with a slipper. In particular, the base part can form one half of a ball joint.

Independent of the manufacture of the piston body, the chambers initially can be open towards the working surface of the piston during their manufacture.

Advantageously, the chambers are closed towards the working surface of the piston by one or more closure elements.

In a first embodiment, each of the chambers can be closed individually by separate closure elements. For example, the closure elements can be plugs which are non-positively pressed into the work-side ends of the chambers. Alternatively, they can be screw elements which are screwed into these ends.

In this embodiment, the working surface of the piston facing the cylinder space is formed by the end face of the base element and by the closure elements inserted into this end face.

In a second embodiment, the chambers can be closed by a common closure element. In particular, the closure element can be an end cap forming the working surface of the piston.

In this embodiment, the connecting surface between the base element and the end cap hence lies on a plane intersecting the skirt surface of the piston, which extends through the piston set back from the working surface.

In a preferred embodiment, the chambers can reach into the end cap and/or at least partly be arranged in the same.

The end cap can be connected with the base element by positive connection, non-positive connection and/or by adhesive connection, e.g. by welding.

According to the present invention, the cavity of the piston body closed in a pressure-tight way includes at least two chambers. Preferably, however, the cavity includes more than three, and more preferably, more than four chambers.

The number of the chambers initially is not subject to an upper or lower limit. Preferably, however, the cavity includes less than 20, and more preferably, less than ten such chambers.

In particular, the cavity can include between five and eight, and in particular six chambers.

Advantageously, the chambers are, as already described above, incorporated in a base element of the piston body. In a first design the base element is made in one piece. As a result, the webs extending between the chambers likewise are made of the material of the base element.

The chambers need not necessarily be separated from each other in a pressure-tight way, but for example can be connected with each other via the end cap in the region of the same. It merely is necessary that the chambers are closed to the outside in a pressure-tight way, so that during operation of the axial piston machine they do not form a dead space which is filled with hydraulic fluid.

In a preferred embodiment, the chambers can be arranged around a middle column of the piston body. Alternatively or in addition, the arrangement of the chambers can be effected symmetrically to the middle axis of the piston body. In particular, the chambers can annularly surround the middle axis of the piston body.

Since the webs left between the chambers inside this ring-shaped arrangement of the chambers extend radially and axially, the piston is stabilized considerably.

In one embodiment of the present invention, the piston body is axially traversed by a pressure channel. This pressure channel can lead from the working side of the piston to the disk side, and serve the lubrication and/or pressure relief of a slipper. In a preferred embodiment, this pressure channel extends in a middle column of the piston body, around which the chambers are arranged.

The piston according to the invention preferably is a slipper piston, wherein the slipper is connected with the piston body via a ball joint.

The piston body can include a hemispherical cutout into which a partly spherical part of the slipper engages. The above-described pressure channel can end in the hemispherical cutout. Preferably, the slipper likewise includes a pressure channel which serves as continuation of the pressure channel in the piston body.

In an alternative design, the slipper also can include a hemispherical cutout into which a partly spherical part engages, which is arranged at the rear end of the piston body. In this case, the pressure channel advantageously ends in the partly spherical part of the piston body, and furthermore advantageously is extended by a pressure channel of the slipper, which begins in the hemispherical cutout.

The present invention furthermore comprises an axial piston machine with one or more pistons, as they have been described above. The axial piston machine can be both a hydraulic pump and a hydraulic motor. Preferably, the axial piston machine is a swash plate machine or a wobble plate machine. Furthermore preferably, the displacement volume of the axial piston machine is adjustable.

In an axial piston machine in swash plate design the swash plate and the control disk are connected with the housing, i.e. they cannot rotate with the same, while the cylinder block rotates with the drive shaft. In a wobble plate machine, on the other hand, the pistons are mounted in a cylinder block fixed in the housing, while the wobble plate and the control disk are connected with the rotating drive shaft. In adjustable machines, the swash plate or wobble plate is pivotally arranged at the housing or the drive shaft.

In both cases, the ends of the pistons facing away from the cylinder volume slide on the swash or wobble plate. This can be effected by having this end of the piston designed as a slipper which is connected with the piston body via a ball joint.

Beside the piston and an axial piston machine according to the invention, the present invention furthermore comprises a method for manufacturing a piston according to the invention, as it has been described above. In a first preferred embodiment of the method according to the invention, the chambers are manufactured by a material-removing method.

The chambers can be incorporated in a base element from the side of the working surface of the piston.

Particularly preferably, the chambers are made by drilling.

Alternatively, the portion of the piston comprising the chambers, in particular a middle part of the piston, also can be made by a forming method, and may be extrusion-molded or forged. Preferably, the middle part then is connected with a base part.

Furthermore, the piston can be manufactured by connecting a middle part, in which the chambers are arranged, with a base part. Preferably, the middle part can be made in one piece or be put together of several elements.

A pressure channel of the piston also can be manufactured by a material-removing method, in particular by drilling.

As described above, the chambers in the piston body and in particular in the base element preferably are closed with one or more closure elements.

Preferably, the manufacture of the pistons is effected such as has already been described above with regard to the piston itself.

The present invention will now be explained in detail with reference to exemplary embodiments and drawings.

BRIEF DESCRIPTION OF THE DRAWINGS

FIG. 4b shows a sectional view in axial direction through the third exemplary embodiment shown in FIG. 4a, and FIG. 4c shows a sectional view in radial direction through the third exemplary embodiment shown in FIG. 4a.

DETAILED DESCRIPTION OF THE INVENTION

Figure 1:
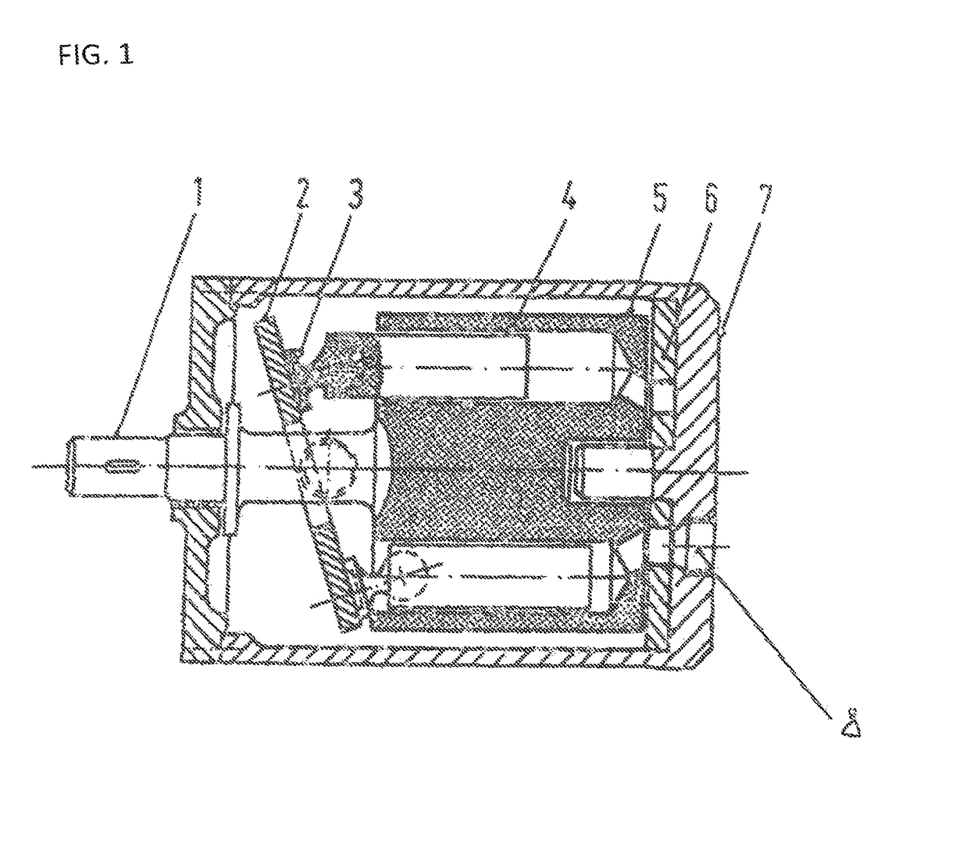
FIG. 1 shows an exemplary embodiment of an axial piston machine according to the invention.

FIG. 1 shows an exemplary embodiment of an axial piston machine according to the invention, in which the pistons according to the invention are used.

The exemplary embodiment relates to a swash plate machine in which the cylinder block 5 is non-rotatably connected with the drive shaft 1. The swash plate 2 is non-rotatably connected with the housing 7, i.e. it cannot rotate with the same. Since the exemplary embodiment relates to an adjustable machine, the same is pivotally mounted at the housing. The piston 4 supports on the swash plate 2. The control disk 6 likewise is non-rotatably connected with the housing 7 and is connected with the pressure line 8.

When the drive shaft 1 and with the same the cylinder block 5 are rotated, the pistons perform a stroke movement. Due to a corresponding design of the control openings in the control disk 6, the same are alternately connected with the high-pressure side and the low-pressure side. By applying a sufficient oil pressure on the low-pressure side or by mounting hold-downs it is ensured that the pistons constantly rest against the swash plate. Such axial piston machines equally are usable both as hydraulic motors and as hydraulic pumps.

In the exemplary embodiment, the pistons include slippers 3 which via a ball joint are connected with the piston body 4 of the pistons and via which the pistons slide on the swash plate.

Figure 2A:
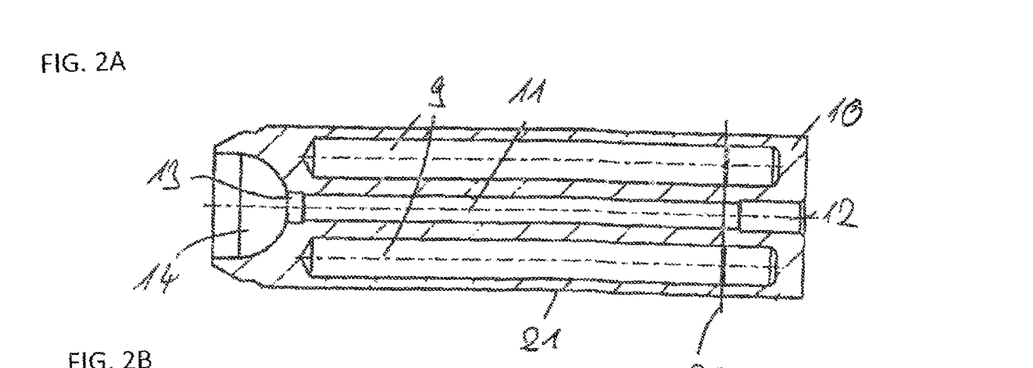
FIG. 2a shows a sectional view in an axial direction through a first exemplary embodiment of a piston body of a piston according to the invention, in which the chambers are made by a material-removing method.
Figure 2B:
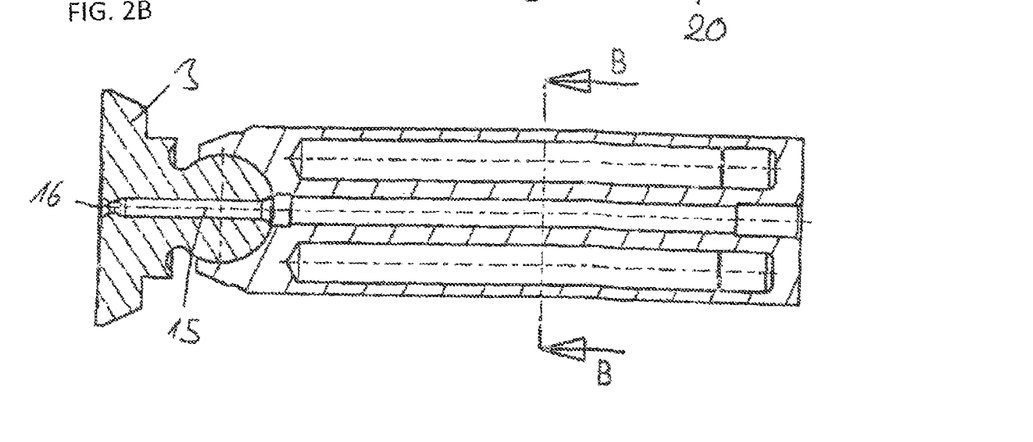
FIG. 2b shows a sectional view in axial direction through a piston according to the invention, in which the piston body shown in FIG. 2a has been completed by a slipper.
Figure 2C:
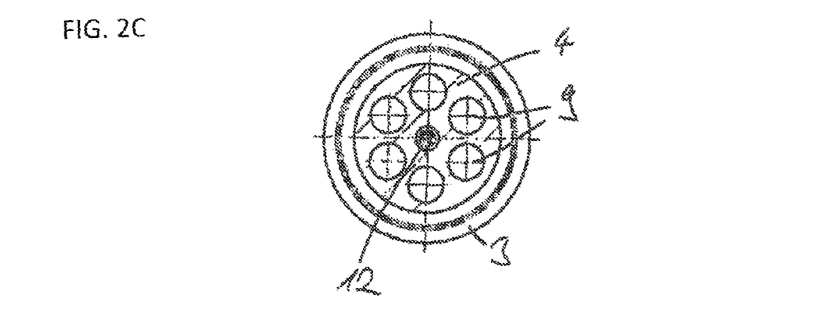
FIG. 2c shows a sectional view in radial direction through the first exemplary embodiment of a piston body as shown in FIG. 2b.
Figure 3A:
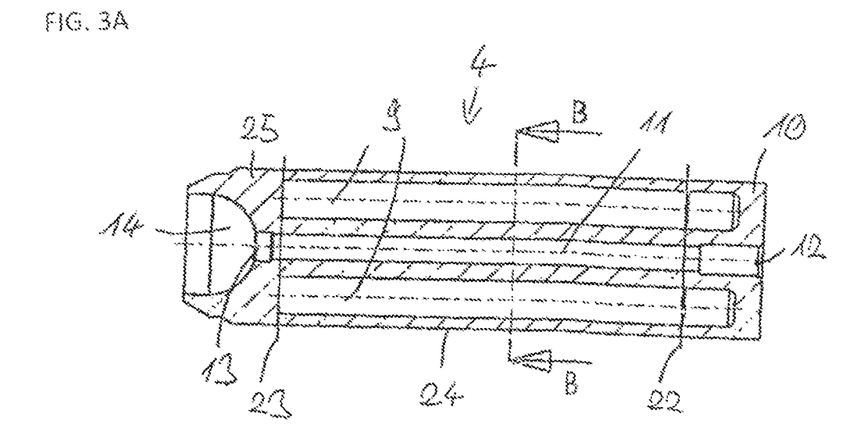
FIG. 3a shows a sectional view in axial direction through a second exemplary embodiment of a piston according to the invention, in which the chambers are arranged in a middle part which has been made by a material-forming method.
Figure 3B:
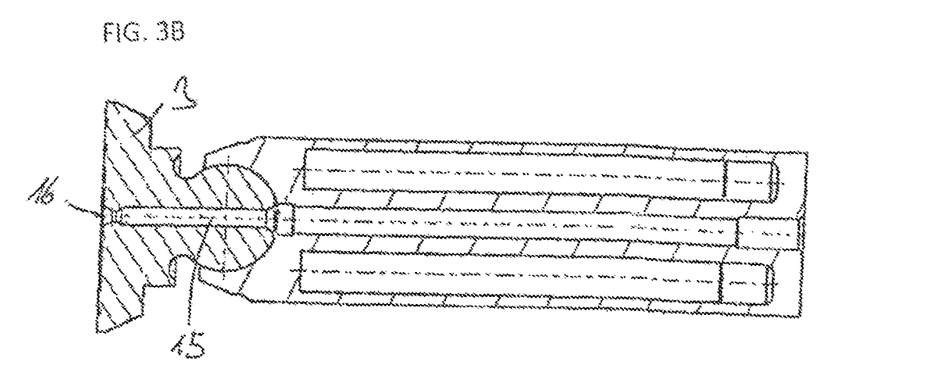
FIG. 3b shows a sectional view in axial direction through a piston according to the invention, in which the piston body shown in FIG. 3a has been completed by a slipper.
Figure 3C:
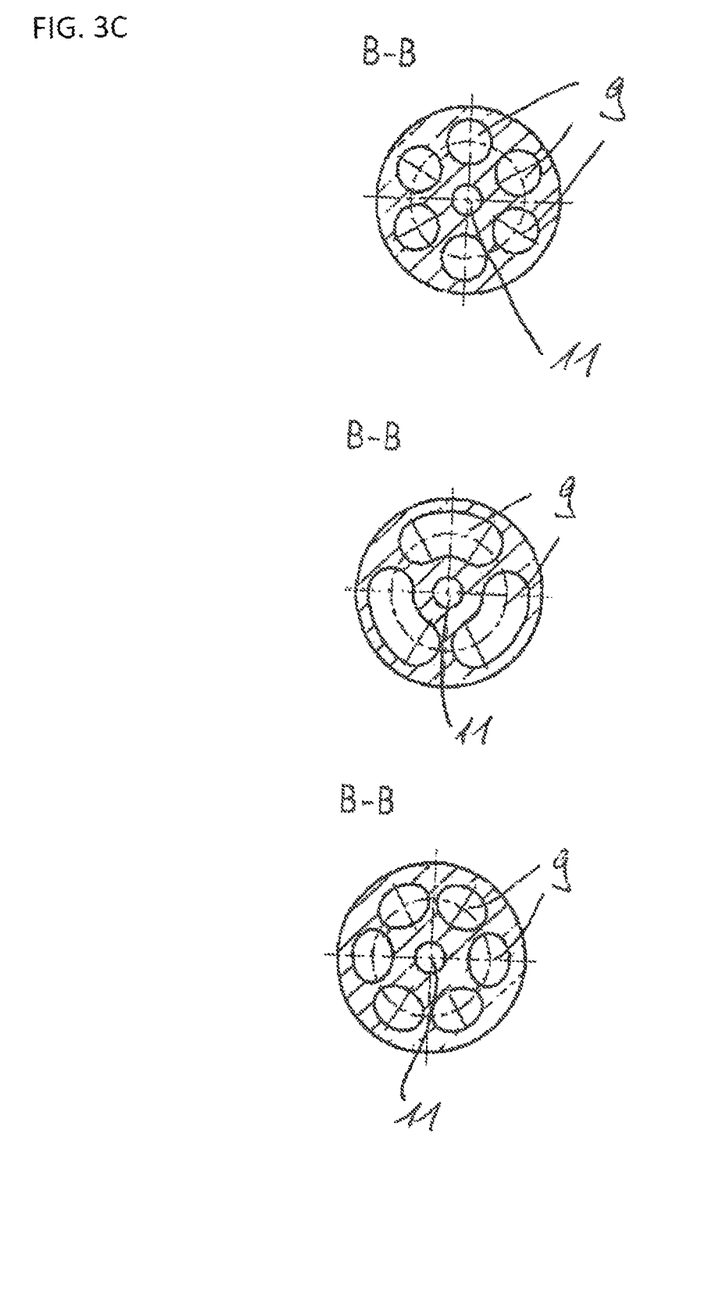
FIG. 3c shows three sectional views in radial direction through possible designs of the second exemplary embodiment of a piston body as shown in FIG. 3a, FIG. 4a shows a perspective view of a third exemplary embodiment of a piston according to the invention, in which the chambers each are separately closed by closure elements.
Figure 4A:
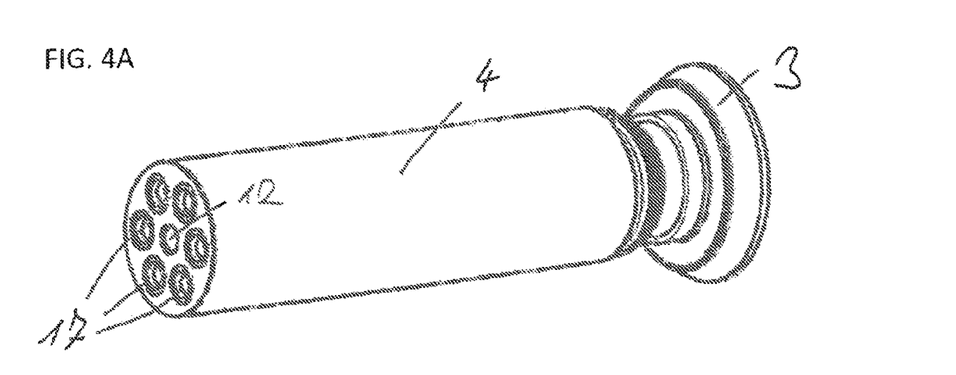
Figure 4B:
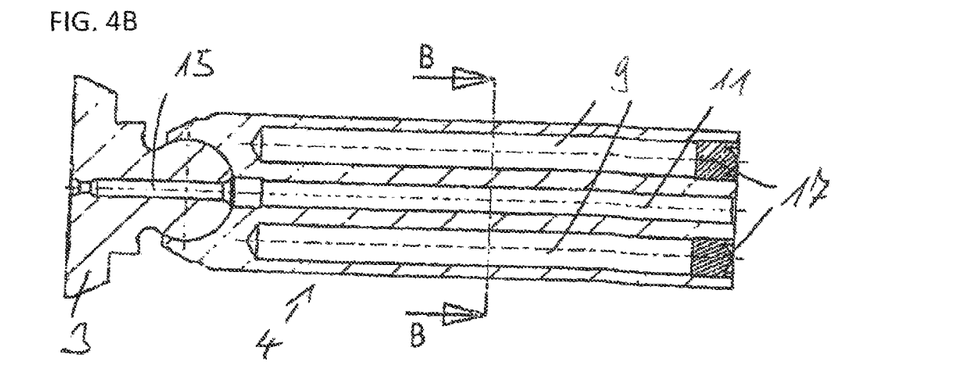
Figure 4C:
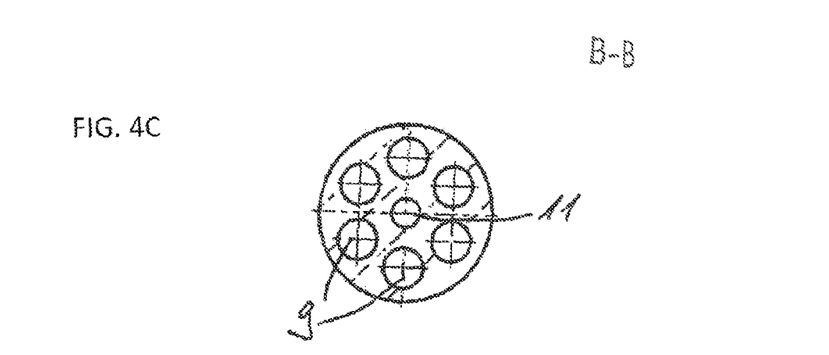

In FIGS. 2 to 4 three exemplary embodiments of pistons are shown, as they are used in the axial piston machine shown in FIG. 1. Each piston body 4 includes a plurality of chambers 9 closed in a pressure-tight way, which reduce the weight of the piston body without creating dead spaces. In cross-section, i.e. in a plane which is vertical to the longitudinal axis of the piston, the chambers 9 are arranged one beside the other. Thus, webs are left between the individual chambers, which stabilize the piston body.

In the first exemplary embodiment of FIG. 2, the chambers are incorporated into an integral base element 24 of the piston body by a material-removing method from the working side of the piston body. The webs left between the chambers hence likewise are made of the material of the piston body. The piston body preferably is made of steel.

In the exemplary embodiments the chambers each are hollow cylindrical bores with a circular base area, which extend axially in the piston body. As can be understood in particular from FIG. 2c, the bores 9 are arranged around a central column of the piston body, which thus remains connected with the outer circumference of the cylinder body via the webs left between the chambers. In the exemplary embodiment six chambers are provided, which are annularly grouped around the central column symmetrically to the middle axis.

In a second exemplary embodiment, which is shown in FIG. 3, the chambers are made by forming. In axial direction, the piston 4 includes a middle part 24 which is made by a forming method, and in particular, is extrusion-molded, cold-rolled, manufactured by pilgering, forged or manufactured as rolled profile.

FIG. 3c shows three exemplary cross-sections through the middle part which includes cylindrical chambers and advantageously is extrusion-molded. As shown in the figures, the base area of the chambers can be e.g. circular, kidney-shaped or oval. The middle part 24 is designed in one piece.

Alternatively, the middle part 24 also can have a multipart design, wherein several elements, of which the middle part is fabricated, can engage into each other in an axial sense (e.g. T-piece in a tube) or in a radial sense (more space for longitudinal profiling), or both at the same time.

The structure produced by forming can be a radial one, an axial one or a combination of a radial and axial structure.

On its end surface 23 facing away from the working side of the piston, the middle part 24 is connected with a base part 25 which serves the articulation to a slipper 3 via a ball joint. The base part 25 preferably is made in one piece and furthermore advantageously includes no closed cavities.

Independent of the manufacture, the piston according to the invention includes a slipper in the exemplary embodiment, wherein a ball head arranged at the slipper 3 is mounted in a hemispherical cutout 14 on the rear side of the cylinder body.

Through the central column a pressure channel 11 extends, which extends from an opening 12 passing through the working surface of the pressure piston to an opening 13 arranged in the region of the bearing of the slipper and is continued by a pressure channel 15 of the slipper. This pressure channel 15 of the slipper ends in a sliding-surface-side opening 16, so that the sliding surface is connected with the cylinder chamber via the pressure channel and thus is hydrostatically relieved. Furthermore, the pressure channel serves for lubricating the slipper.

The pressure channel 11 likewise can be incorporated into the cylinder body 4 by a bore. In the exemplary embodiment shown in FIG. 3 the pressure channel can be manufactured by the forming process together with the chambers 9 at least in the region of the middle part 24.

The two exemplary embodiments shown in FIGS. 2 and 3 differ from the third exemplary embodiment shown in FIG. 4 with regard to the closure of the chambers 9.

In the exemplary embodiments shown in FIGS. 2 and 3 an end cap 10 is provided, which is applied onto the end-face end 20 of the base element 21 or the end-face end 22 of the middle part 24, for example by welding. The end cap 10 forms the entire working surface of the piston and closes all chambers 9 as common closure element. Centrally through the closing cap 10 the pressure channel 11 is guided. In the exemplary embodiment, the chambers 9 are extended into the end cap 10, in order to further reduce the weight.

In the exemplary embodiment shown in FIG. 4, on the other hand, the chambers 9 are closed individually by plugs 17 which are pressed into the end-face ends of the chambers 9. As shown in FIG. 4a, the working surface therefore is formed by the end-face end of the base element or the middle part and by the plugs arranged in this base element or middle part. Instead of plugs pressed in screw elements might also be used, for example.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A piston for an axial piston machine, comprising:
   a piston body, which, in its interior, includes a cavity closed in a pressure-tight way, and
   webs left between several chambers into which the cavity is divided,
   wherein the chambers are arranged about a central column of the piston body, and wherein the chambers have an arrangement that is symmetrical or asymmetrical to the middle axis of the piston body.

2. The piston according to claim 1, wherein the chambers are arranged one beside the other in cross-section of the piston body and/or extend axially in the piston body.

3. The piston according to claim 2, wherein the chambers are manufacturable by material-removing methods, wherein the chambers are bores, or wherein the piston body includes an integral base element in which the chambers are incorporated, and wherein the chambers are closed towards a working surface of the piston by one or more closure elements.

4. The piston according to claim 2, wherein the piston body includes a middle part which is connected with a base part, wherein the chambers are arranged in the middle part, wherein the middle part or elements of which the middle part is made are at least partly manufactured by a forming process or by DMLS, or wherein the middle part is made in one piece or consists of several elements.

5. The piston according to claim 2, wherein each of the chambers is closed individually by a separate closure element, and wherein the closure elements are plugs or screw elements.

6. The piston according to claim 2, wherein the chambers are closed by a common closure element, wherein the closure element is an end cap forming the working surface of the piston, and wherein the chambers reach into the end cap or are at least partly arranged in the end cap.

7. The piston according to claim 1, wherein the chambers are formed hollow and cylindrical.

8. The piston according to claim 1, wherein the chambers are manufacturable by material-removing methods, wherein the chambers are bores, or wherein the piston body includes an integral base element in which the chambers are incorporated, and wherein the chambers are closed towards a working surface of the piston by one or more closure elements.

9. The piston according to claim 1, wherein the piston body includes a middle part which is connected with a base part, wherein the chambers are arranged in the middle part, wherein the middle part or elements of which the middle part is made are at least partly manufactured by a forming process or by DMLS, or wherein the middle part is made in one piece or consists of several elements.

10. The piston according to claim 1, wherein each of the chambers is closed individually by a separate closure element, and wherein the closure elements are plugs or screw elements.

11. The piston according to claim 1, wherein the chambers are closed by a common closure element, wherein the closure element is an end cap forming the working surface of the piston, and wherein the chambers reach into the end cap or are at least partly arranged in the end cap.

12. The piston according to claim 1, wherein the piston body is axially traversed by a pressure channel, and wherein the pressure channel extends in the central column.

13. The piston according to claim 1, further comprising a slipper which is connected with the piston body via a ball joint, wherein the piston body includes a hemispherical cutout into which a partly spherical part of the slipper engages, and wherein a pressure channel ends in the hemispherical cutout or the slipper includes the pressure channel.

14. An axial piston machine comprising at least one piston according to claim 1.

15. A method for manufacturing a piston for an axial piston machine, including a piston body, which, in its interior, includes a cavity closed in a pressure-tight way, and webs left between several chambers into which the cavity is divided, comprising:
   making the piston by connecting a middle portion, in which the chambers are arranged, with a base part, and making a pressure channel of the piston by drilling.

* * * * *